US008803394B2

United States Patent
Sano et al.

(10) Patent No.: US 8,803,394 B2
(45) Date of Patent: Aug. 12, 2014

(54) ROTOR FOR ROTARY ELECTRIC MACHINE HAVING A MAGNETIC FLUX-RESTRAINING HOLE

(75) Inventors: Shinya Sano, Toyota (JP); Ken Takeda, Anjo (JP); Tomohiro Inagaki, Nishio (JP); Shinichi Otake, Aichi-ken (JP); Tsuyoshi Miyaji, Toyohashi (JP); Akifumi Kurokawa, Kariya (JP)

(73) Assignees: Toyota Jidosha Kabushiki Kaisha, Aichi-ken (JP); Aisin Seiki Kabushiki Kaisha, Aichi-ken (JP); Aisin AW Co., Ltd., Aichi-ken (JP)

( * ) Notice: Subject to any disclaimer, the term of this patent is extended or adjusted under 35 U.S.C. 154(b) by 255 days.

(21) Appl. No.: 13/364,526

(22) Filed: Feb. 2, 2012

(65) Prior Publication Data

US 2012/0200193 A1   Aug. 9, 2012

(30) Foreign Application Priority Data

Feb. 3, 2011   (JP) ................................. 2011-021479

(51) Int. Cl.
*H02K 21/12* (2006.01)
*H02K 1/06* (2006.01)

(52) U.S. Cl.
USPC ............ 310/156.57; 310/156.49; 310/156.54; 310/216.106

(58) Field of Classification Search
CPC .................................. H02K 1/27; H02K 21/12
USPC ............... 310/156.49, 156.53, 156.5, 156.57, 310/216.106, 216.108
See application file for complete search history.

(56) References Cited

U.S. PATENT DOCUMENTS

| 6,847,143 | B1 | 1/2005 | Akemakou | |
|---|---|---|---|---|
| 2009/0134732 | A1* | 5/2009 | Shichijoh et al. | 310/156.53 |
| 2010/0079025 | A1* | 4/2010 | Suzuki et al. | 310/156.11 |
| 2011/0291515 | A1* | 12/2011 | Li et al. | 310/156.53 |

FOREIGN PATENT DOCUMENTS

| CN | 101478212 A | 7/2009 |
|---|---|---|
| JP | 11-341719 A | 12/1999 |
| JP | 2002-540754 A1 | 11/2002 |
| JP | 2005130604 A * | 5/2005 |
| JP | 2009-124899 A | 6/2009 |
| JP | 2010-178535 A | 8/2010 |
| JP | 2012-161226 A | 8/2012 |
| JP | 2012-161227 A | 8/2012 |

(Continued)

OTHER PUBLICATIONS

Machine Translation JP2005130604 (2005).*

(Continued)

*Primary Examiner* — Tran Nguyen
*Assistant Examiner* — Jose Gonzalez Quinone
(74) *Attorney, Agent, or Firm* — Sughrue Mion, PLLC

(57) ABSTRACT

In a rotor for a rotary electric machine, a plurality of magnetic poles are provided in a radially outer portion of the rotor iron core, at intervals in the circumferential direction. Each magnetic pole includes a pair of permanent magnets disposed apart from each other in the circumferential direction, and a magnetic flux-restraining hole that is formed and extended radially inwardly between radially inner end portions of the permanent magnets and that restrains flow of magnetic flux. The magnetic flux-restraining hole is extended so as to project beyond a position of the radially inner end portions to a radially outer side, between the pair of permanent magnets.

5 Claims, 8 Drawing Sheets

(56) References Cited

FOREIGN PATENT DOCUMENTS

| | | |
|---|---|---|
| JP | 2012-161228 A | 8/2012 |
| JP | 2012-165480 A | 8/2012 |
| JP | 2012-165482 A | 8/2012 |

OTHER PUBLICATIONS

Japanese Office Action dated May 7, 2013 issued in Japanese Patent Application No. 2011-021479.

* cited by examiner

ROTOR FOR ROTARY ELECTRIC MACHINE HAVING A MAGNETIC FLUX-RESTRAINING HOLE

INCORPORATION BY REFERENCE

The disclosure of Japanese Patent Application No. 2011-021479 filed on Feb. 3, 2011 including the specification, drawings and abstract is incorporated herein by reference in its entirety.

BACKGROUND OF THE INVENTION

1. Field of the Invention

The invention relates to a rotor for a rotary electric machine and, particularly, to a rotor for a rotary electric machine which includes a plurality of permanent magnets that are buried in a radially outer-side interior of a rotor iron core, at intervals in the circumferential direction of the rotor iron core.

2. Description of the Related Art

As a related art, a synchronous type rotary electric machine equipped with a rotor 90 that has a magnetic pole construction as shown in FIG. 10 is disclosed in, for example, Japanese Patent Application Publication No. 2009-124899 (JP-A-2009-124899). In this rotor 90, a plurality of magnetic poles 93 (only one magnetic pole is shown in FIG. 10) are provided equidistantly in the circumferential direction within a portion of a cylindrical rotor iron core 91 which is in the vicinity of an outer peripheral surface 92 of the cylindrical rotor iron core 91.

Each magnetic pole 93 has a pair of permanent magnets 94 that are disposed so that the interval distance between the pair of permanent magnets 94 increases toward the outer peripheral surface 92, and a magnetic flux-restraining hole 96 which is formed in a region that is between radially inner end portions 95 of the permanent magnets 94 and that is radially inwardly of the pair of permanent magnets 94. The magnetic flux-restraining hole 96 is constructed of three holes 96a, 96a and 96b. Of the three holes, two end holes 96a and 96a having a generally triangular shape are formed so as to communicate with magnet insertion holes 96, respectively, in which the permanent magnets 94 having an end face shape of a flat elongated rectangle are inserted. Besides, a generally rectangular central hole 96b is formed between the two end holes 96a and 96a, and is separated from the end holes 96a and 96a by bridge portions 97 that are thin iron core regions. It is to be noted herein that radially outer-side (or outer periphery-side) edge portions of the three holes 96a, 96a and 96b are aligned along a straight line 98 shown by a one-dot chain line in FIG. 10 which passes through a radially inner-side corner portion (or edge portion) of each of the pair of permanent magnets 94.

In the rotary electric machine equipped with the rotor 90 whose magnetic poles 93 are constructed as described above, the magnetic flux-restraining hole that includes an air gap at a center of a radially inward portion of each magnetic pole 93 is provided so as to increase the difference between the q-axis inductance Lq and the d-axis inductance Ld of the magnetic pole 93 and therefore enhance the reluctance torque.

In the above-described magnetic poles 93 of the rotor 90 disclosed in Japanese Patent Application Publication No. 2009-124899 (JP-A-2009-124899), a q-axis magnetic path region 99 that is made up of a belt-shaped region having a generally circular arc shape is formed between the pair of permanent magnets 94. Thus, iron core regions 100 that are radially outwardly of the end holes 96a of the magnetic flux-restraining hole 96 (that are above the end holes 96a in FIG. 10) are secured as regions in which no q-axis magnetic flux flows. Besides, since the iron core regions 100 face the radially inner end portions 95 of the permanent magnets 94, the iron core regions 100 allows or causes magnetic fluxes from the radially inner end portions 95 of the magnets 94 to leak or short-circuit toward the bridge portions 97 and the end holes 96a.

SUMMARY OF THE INVENTION

In light of the above-described circumstances, the invention provides a rotor for a rotary electric machine which is capable of increasing torque by reducing the leakage and short-circuit of magnetic fluxes of magnets produced from the radially inner end portions of permanent magnets.

According to an aspect of the invention, there is provided a rotor for a rotary electric machine which includes a rotor iron core, and a plurality of magnetic poles provided at intervals in a circumferential direction of the rotor iron core within a radially outer-side interior of the rotor iron core. Each of the magnetic poles of this rotor for a rotary electric machine includes a pair of permanent magnets disposed apart from each other in the circumferential direction, and a magnetic flux-restraining hole that is formed and extended radially inwardly between radially inner end portions of the permanent magnets and that restrains flow of magnetic flux, and the magnetic flux-restraining hole is extended so as to project beyond a position of the radially inner end portions to a radially outer side, between the pair of permanent magnets.

In the rotor in accordance with the invention, the pair of permanent magnets may be disposed so that an interval distance between the permanent magnets increases toward the radially outer side of the rotor iron core, and the magnetic flux-restraining hole may include two first holes that respectively communicate with magnet insertion holes that are provided for inserting the permanent magnets into the rotor iron core, and a second hole that is formed between the two first holes and that is separated from the first holes by a bridge portion, and the first holes and the second hole may have equal projection widths from the radially inner end portions of the permanent magnets.

Besides in the rotor in accordance with the invention, the pair of permanent magnets may be disposed so that an interval distance between the permanent magnets increases toward the radially outer side of the rotor iron core, and the magnetic flux-restraining hole may include two first holes that respectively communicate with magnet insertion holes that are provided for inserting the permanent magnets into the rotor iron core, and a second hole that is formed between the two first holes and that is separated from the first holes by a bridge portion, and a projection width of the first holes from the radially inner end portions of the permanent magnets may be larger than the projection width of the second hole from the radially inner end portions of the permanent magnets.

Besides, in the rotor in accordance with the invention, the pair of permanent magnets may be disposed so that an interval distance between the permanent magnets increases toward the radially outer side of the rotor iron core, and the magnetic flux-restraining hole may include two holes that respectively communicate with magnet insertion holes that are provided for inserting the permanent magnets into the rotor iron core, and the two holes are formed on opposite sides of one bridge portion, and the bridge portion may be provided at a center of each of the magnetic poles in the circumferential direction. In this construction, the bridge portion may extend along a magnetic pole center line that passes through the center of each magnetic pole in a radial direction of the rotor iron core, or the bridge portion may extend in a direction that obliquely intersects with the magnetic pole center line.

Furthermore, in the rotor in accordance with the invention, the magnetic flux-restraining hole may be constructed of one hole that communicates with magnet insertion holes that are provided for inserting the permanent magnets into the rotor iron core.

According to the above-described rotor for a rotary electric machine, since the magnetic flux-restraining hole formed and extended radially inwardly between the radially inner end portions of the permanent magnets within each magnetic pole is extended so as to project beyond the position of the radially inner end portions to the radially outer side between the pair of permanent magnets, it is possible to reduce the leakage of magnetic fluxes produced from the radially inner end portions of the permanent magnets toward the magnetic flux-restraining hole or reduce the short circuit of the magnets' magnetic fluxes to a circumferentially outer side surface of each permanent magnet, that is, an opposite side surface thereof to the center of the magnetic pole in the circumferential direction. Therefore, the magnetic fluxes produced from the radially inner end portions of the permanent magnets can be directed toward the radially outer side of the rotor iron core, that is, the outer periphery side of the rotor iron core, so that the magnet torque can be enhanced. At the same time, due to the extension of the magnetic flux-restraining hole to the radially outer side, the d-axis inductance declines, so that the reluctance torque can be increased.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Embodiments of the invention will be described in detail hereinafter with reference to the accompanying drawings. In the description below, concrete shapes, materials, directions, etc. are mentioned as mere illustrations for facilitating the understanding of the invention, and can be appropriately changed according to uses, purposes, specifications, etc.

Figure 1:
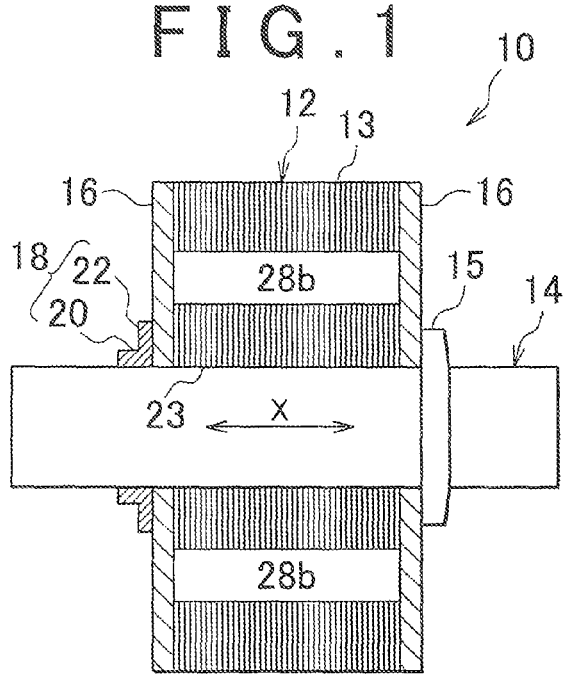
FIG. 1 is a sectional view of a rotor for a rotary electric machine (hereinafter, simply termed the rotor as appropriate) as an embodiment of the invention, which is taken along the axis of the rotor.

FIG. 1 shows a section of a rotor 10 for a rotary electric machine according to an embodiment of the invention, which is taken along the axis of the rotor 10. A hollow cylindrical stator (not shown) is provided around the rotor 10. The stator is provided for forming magnetic fields for rotating the rotor 10.

The rotor 10 includes: a cylindrical or generally cylindrical rotor iron core 12 having a shaft hole 23 in a radial center portion of the rotor iron core 12, a shaft 14 that penetrates through the shaft hole 23 of the rotary iron core 12 and is fixed thereto; end plates 16 disposed in contact with two opposite sides of the rotor iron core 12 in the direction of the axis of the shaft 14 (and of the rotor iron core 12) shown by an arrowed line X; and a fixture member 18 that fixes the rotor iron core 12 and the end plates 16 on the shaft 14.

The rotor iron core 12 is constructed by stacking many magnetic steel sheets in the axis direction of the rotor iron core 12. The magnetic steel sheets are formed by punching out annular pieces from, for example, a silica steel sheet having a sheet thickness of 0.3 mm, or the like. The magnetic steel sheets of the rotor iron core 12 are linked together entirely as one unit throughout the rotor iron core 12 or separately for a plurality of blocks divided in the axis direction of the rotor iron core 12, by a method of swage, adhesion, welding, etc. Besides, in the rotor iron core 12, a plurality of magnetic poles are provided at equal intervals in the circumferential direction. Each magnetic pole includes a plurality of permanent magnets and a magnetic flux-restraining hole. However, details of the construction will be described later. The position of the rotor iron core 12 on the shaft 14 in the circumferential direction is fixed by fixation through tight fitting or by key fitting.

The shaft 14 is formed of a round steel rod. On an outer periphery of the shaft 14, there is formed a flange portion 15 that is protruded radially outward. When the rotor 10 is assembled, the flange portion functions as a contact portion that contacts one of the end plates 16 and therefore defines the position of the rotor iron core 12 on the shaft 14 in the axis direction thereof.

The end plates 16 are each formed of a disc plate that has substantially the same external shape as an end surface of the rotor iron core 12 in the axis direction, that is, an axial end surface thereof. The end plats 16 are suitably formed from a non-magnetic metal material, for example, aluminum, copper, etc. A non-magnetic metal material is used herein in order to restrain the short-circuit of magnetic fluxes at axial end portions of the permanent magnets that constitute the magnetic poles. However, the material of the end plats 16 is not limited to a metal material as long as it is a non-magnetic material. For example, a resin material may also be used to form the end plates 16.

The end plates 16 provided on both sides of the rotor iron core 12 in the axis direction has a function of pressing the rotor iron core 12 from the two opposite sides, a function of correcting any imbalance of the rotor 10 by allowing itself to be partially cut after the rotor 10 has been assembled, a function of preventing the permanent magnets that constitute the magnetic poles from popping out from the rotor iron core 12 in the axis direction, etc.

Incidentally, although the embodiment will be described and illustrated in the drawings on the assumption that the end plates 16 have substantially the same diameter as the rotor iron core 12, the end plates may also be reduced in diameter or may also be abolished or the like so as to lessen the cost in, among other cases, the case where the permanent magnets that constitute the magnetic poles are fixed within the rotor iron core by resin or the like.

The fixture member 18 includes a swaged portion 20 having a hollow cylindrical shape, and a presser portion 22 protruded radially outward from a side end portion of the swaged portion 20. The fixture member 18 is fixed on the shaft 14 as the swaged portion 20 is swaged to the shaft 14 while the fixture member 18 presses, by its presser portion 22, the two end plates 16 toward the aforementioned flange portion 15. Due to this process, the rotor iron core 12, together with the end plates 16, is fixed to the shaft 14.

Figure 2:
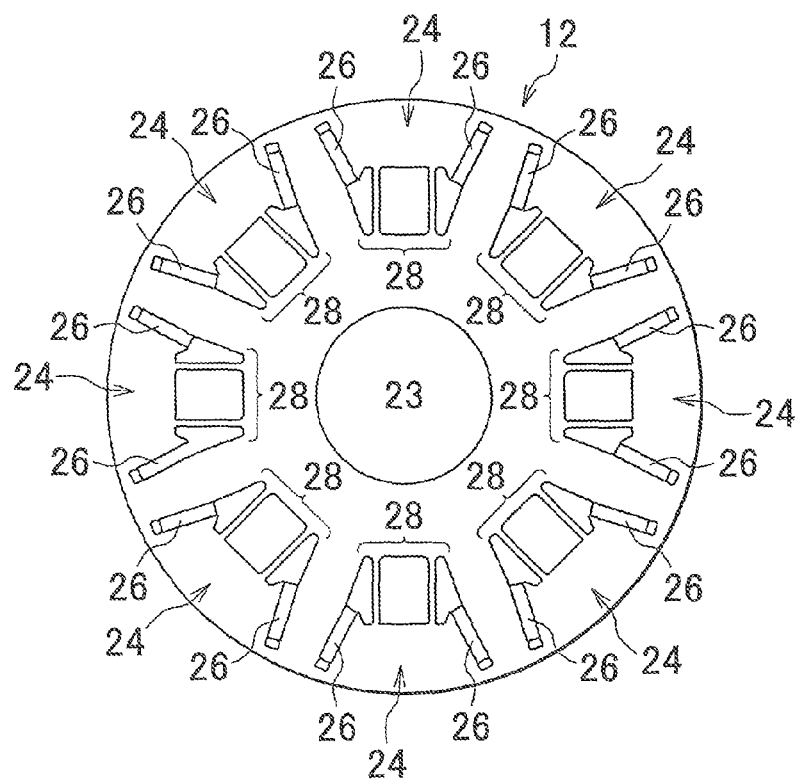
FIG. 2 is a diagram showing an axial end surface of a rotor iron core of the rotor shown in FIG. 1.
Figure 3:
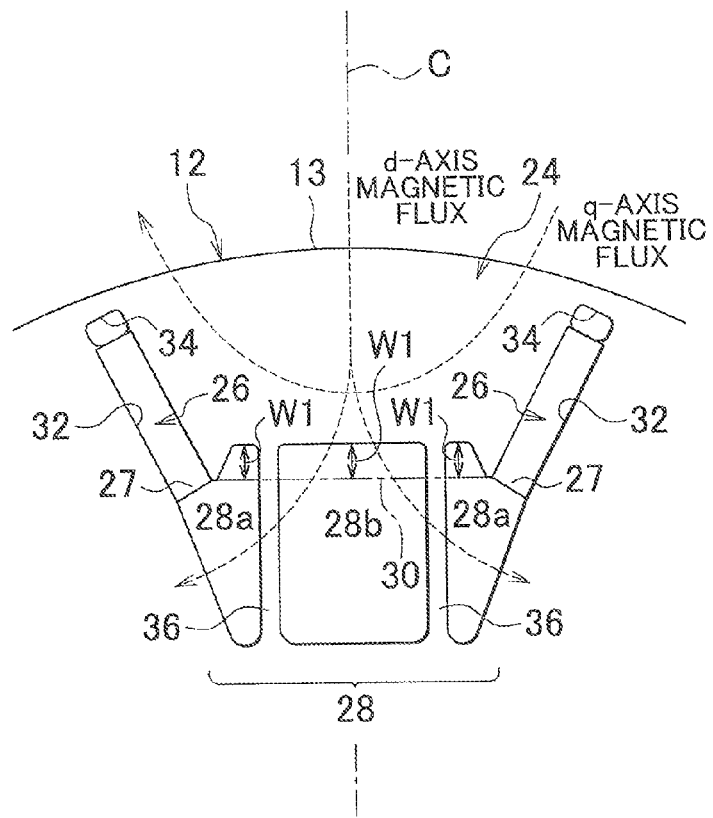
FIG. 3 is an enlarged partial view of one of magnetic poles shown in FIG. 2.

Next, the construction of the rotor iron core 12 will be described with reference to FIGS. 2 and 3. FIG. 2 is a diagram showing an end surface of the rotor iron core in its axis direction. The construction shown in FIG. 2 is substantially the same as the construction of a cross section of the rotor iron core 12 perpendicular to the axis direction. Besides, FIG. 3 is a diagram showing an enlarged view of one of magnetic poles 24 shown in FIG. 2.

In a central portion of the rotor iron core 12 having a hollow cylindrical external shape, there is formed a shaft hole 23 in which the shaft 14 is to be inserted and fixed. In the case where the rotor iron core 12 is fixed to the shaft 14 by tight fitting, the shaft hole 23 is circular in cross section and an edge portion of the shaft hole 23 does not have a key, as shown in FIG. 2. However, in the case where the rotor iron core 12 is mounted on the shaft 14 by key fitting, a key (or a key groove) is protruded from (or formed as a recess in) the edge portion of the shaft hole 23.

A plurality of magnetic poles 24 are provided equidistantly in the circumferential direction within a radially outer portion of the rotary iron core 12. In this embodiment, eight magnetic poles 24 are provided at angle intervals of 45° in the circumferential direction as an example arrangement. The magnetic poles 24 have the same construction, except for the magnetization directions of the permanent magnets 26. Therefore, one magnetic pole 24 will be described below.

A magnetic pole 24 includes a pair of permanent magnets 26 and a magnetic flux-restraining hole 28. The pair of permanent magnets 26 are buried in an interior of the rotor iron core 12 in the vicinity of an outer peripheral surface 13 of the rotor iron core 12. As shown in FIG. 3, the pair of permanent magnets 26 in the magnetic pole 24 have equal shapes and equal sizes. That is, each of the permanent magnets 26 has two axial end surfaces (and a cross section orthogonal to a longitudinal axis) of a flattened rectangular shape, two relatively narrow side surfaces that contain the short sides of the flattened rectangular end surfaces and two relatively wide side surfaces that contain the long sides of the flattened rectangular end surfaces, and have substantially the same length in the longitudinal axis as the rotor iron core 12. However, this construction is not restrictive, but the pair of permanent magnets 26 may be different from each other in at least one of shape and size.

The pair of permanent magnets 26 in the magnetic pole 24 are inserted and fixed in magnet insertion holes 32, respectively, and are thus buried in the magnetic pole 24. The pair of permanent magnets 26 are disposed in a generally V shape arrangement and, more specifically, in a shape of two arm portions of a letter V, in which the interval distance between the pair of permanent magnets 26 increases toward the outer peripheral surface 13 of the rotor iron magnet 12. In other words, the pair of permanent magnets 26 are disposed so that the interval distance between the permanent magnets 26 decreases toward a radially inner side. Furthermore, the pair of permanent magnets 26 are arranged symmetrically about a magnetic pole center line C that is a radial line that passes through a center position in the magnetic pole 24 in the circumferential direction. However, this is not restrictive, but a pair of permanent magnets 26 may be asymmetrically disposed about the magnetic pole center line C.

The permanent magnets 26 are inserted into the magnet insertion holes 32 that extend within the rotor iron core 12 in the axis direction, and are fixed therein by a material, for example, a thermosetting resin, that is poured into narrow gaps between the wide side surfaces of the permanent magnets 26 and the inner wall surfaces of the magnet insertion holes 32. Each permanent magnet 26 is disposed in a posture in which the wide side surfaces of the permanent magnet 26 are substantially along a radial direction of the rotor iron core 12.

A pocket portion 34 is formed at a radially outer side of each magnet inert hole 32 so as to communicate with the magnet insertion hole 32. Each packet portion 32 extends in the axis direction along the adjacent narrow side surface of a corresponding one of the permanent magnets 26. Since each pocket portion 34 has therein an air gap or a resin that is lower in magnetic permeability than magnetic steel sheets, each pocket portion 34 has a function of restraining the short circuit of magnetic fluxes in a radially outer end portion of the adjacent permanent magnet 26 that exists in a direction along the long sides of the rectangular cross section of the permanent magnet 26. The resin for fixing the permanent magnets 26 may be poured into spaces between the wide side surfaces of the permanent magnets 26 and the inner wall surfaces of the magnet insertion holes 32 by way of the pocket portions 34.

The magnetic flux-restraining hole 28 is formed at a radially inward position between radially inner-side end portions of the pair of permanent magnets 26 that are contained in the magnetic pole 24 (a position at a lower side in FIG. 3). The magnetic flux-restraining hole 28 has therein an air gap (or a resin) that is lower in magnetic permeability than the magnetic steel sheets, and therefore has a function of determining or restraining the flow of magnetic fluxes produced from the permanent magnets 26 (and magnetic fluxes that are produced from the stator (not shown) and enter the inside of the rotor iron core).

In this embodiment, the magnetic flux-restraining hole 28 is made of up two first holes 28a and 28a and one second hole 28b. Each of the first holes 28a and 28a is formed so as to communicate with a radially inner end portion of an adjacent one of the magnetic insertion holes 32 in which the permanent magnets 26 are inserted. The first holes 28a and 28a are formed in generally triangular shapes that are mirror symmetric about the magnetic pole center line C. Besides, each of the first holes 28a and 28a has therein an air gap (or a resin) that is lower in magnetic permeability than the magnetic steel sheets, and therefore has a function of restraining the leakage and the short circuit of magnetic fluxes in a radially inner end portion 27 of the adjacent permanent magnet 26 which exists in the direction along the long sides of the flattened rectangular cross-sectional shape thereof. Incidentally, the resin for fixing the permanent magnets 26 may be poured into the magnetic insertion holes 32 via the first holes 28a.

The second hole 28b has a generally rectangular shape, and is formed between the first holes 28a and 28a, and is separated therefrom by bridge portions 36. Besides, the second hole 28b is located at a center position between the pair of permanent magnets 26 in the circumferential direction (i.e., in a portion that is symmetric about the magnetic pole center line C), and faces the outer peripheral surface 13. The second hole 28b, similarly to the first holes 28a and 28a, has therein an air gap (or a resin) that is lower in magnetic permeability than the magnetic steel sheets, and therefore has a function of directing the magnetic fluxes produced from the mutually facing surface sides of the pair of permanent magnets 26, toward the radially outer side, and also performs a function of determining the flow of q-axis magnetic fluxes from the stator which pass through a magnetic path region between the pair of permanent magnets 26 in a generally circular arc passage shape.

The first and second holes 28a and 28b constituting the magnetic flux-restraining hole 28 are extended so as to project beyond a position of the radially inner end portions 27 of the permanent magnets 26 to the radially outer side, between the pair of permanent magnets 26. More specifically, radially outer edge portions of the first and second holes 28a and 28b project to the radially outer side by a width W1 from an imaginary straight line 30 that connects circumferentially inner corner portions of the pair of permanent magnets 26 (i.e., corner or edge portions thereof that face each other in the circumferential direction).

Figure 4:
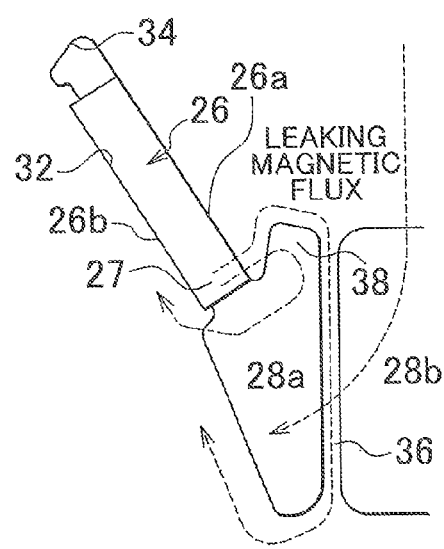
FIG. 4 is a diagram for describing the leakage and the short-circuit of magnetic fluxes in the magnetic pole shown in FIG. 3.

Next, the flow of magnetic fluxes in the magnetic pole 24 constructed as described above will be described. FIG. 4 is a diagram for describing the leakage and the short circuit of magnetic fluxes in the radially inner end portion 27 of a permanent magnet 26 contained in the magnetic pole 24. As shown in FIG. 4, an extended portion 38 of the first hole 28a faces the radially inner end portion 27 of the permanent magnet 26. This arrangement restrains a magnetic flux produced from the radially inner end portion 27 from short-circuiting to a back surface 26b side via the first hole 28a, and also reduces the amount of magnetic fluxes that go around a radially outer side of the extended portion 38 and that leak via the bridge portion 36. Therefore, the amount of magnetic fluxes from the permanent magnets 26 toward the outer peripheral surface 13 side increases, so that the magnet torque can be increased.

Besides, since the magnetic flux-restraining hole 28 is extended to the radially outer side, it is possible to considerably reduce the d-axis inductance Ld of the magnetic pole 24. Therefore, the reluctance torque that increases proportionally to the difference between the q-axis inductance Lq and the d-axis inductance Ld also increases. Therefore, according to the rotary electric machine that employs the rotor 10 of this embodiment, it is possible to enhance both the magnetic torque and the reluctance torque.

Figure 5:
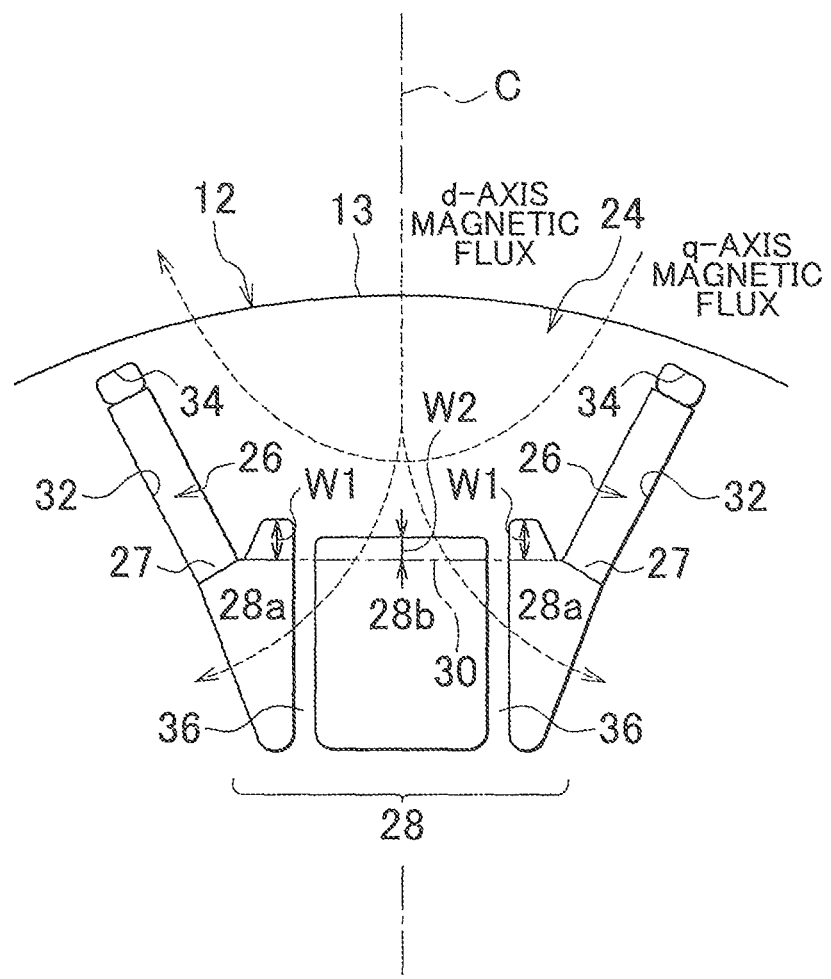
FIG. 5 is an enlarged partial view of a modification of the embodiment, in which the magnetic pole construction shown in FIG. 3 is modified.

Incidentally, although in the example shown in FIG. 3, the first holes 28a and the second hole 28b are formed so as to have equal widths of projection from the imaginary line 30, this is not restrictive. As a first modification of this embodiment, a projection width W1 of the first holes 28a may be larger than a projection width W2 of the second hole 28b as shown in FIG. 5. This makes it possible to realize optimum adjustment of the d-axis inductance Ld and the q-axis inductance Lq in each magnetic pole 24 while restraining the leakage and the short circuit of magnetic fluxes at the radially inner end portions 27 of the permanent magnets 26.

Figure 6A:
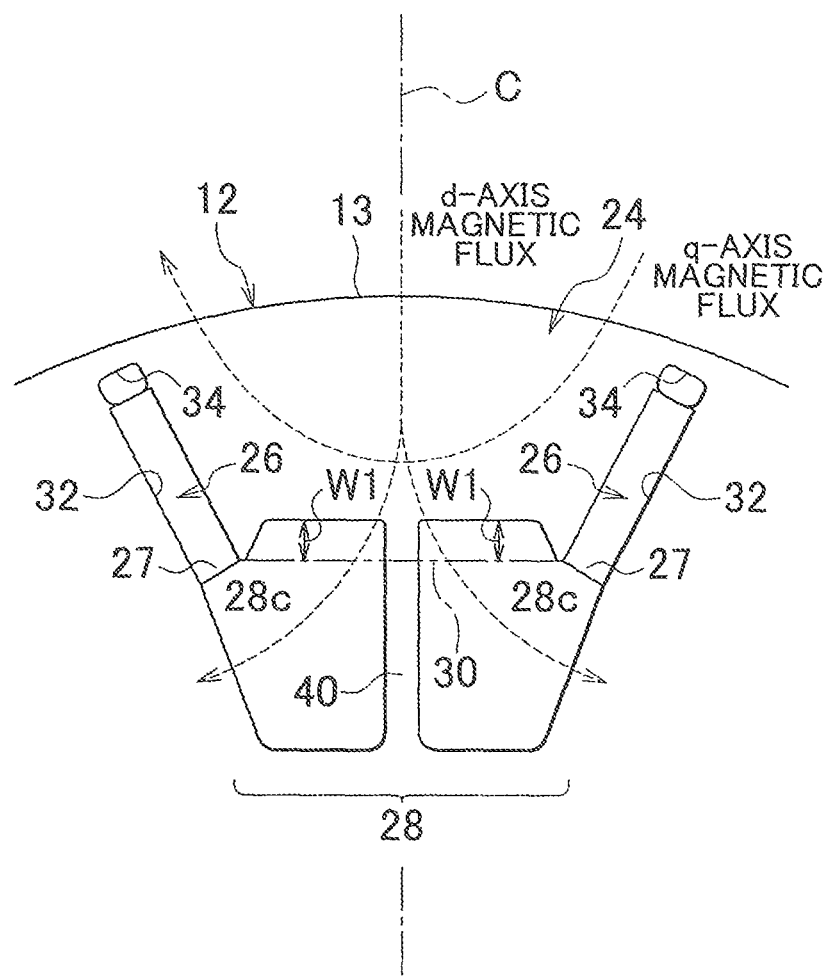
FIG. 6A is a diagram showing a second modification of the embodiment that is an example of a magnetic flux-restraining hole that includes one bridge portion.

Next, second to sixth modifications as improvements or modifications of the foregoing embodiment will be described with reference to FIGS. 6A to 9. FIG. 6A shows a second modification in which the magnetic flux-restraining hole 28 of each magnetic pole 24 is constructed of two holes. In this modification, the magnetic flux-restraining hole 28 is constructed of two holes 28c and 28c that communicate with the magnet insertion holes 32. These holes 28c and 28c face each other across a single bridge portion 40. A radially outer edge portion of each of the holes 28c is extended so as to project from the imaginary straight line 30 to the radially outer side. In this example, the bridge portion 40 is formed at a position that corresponds to the magnetic pole center line C, and extends in a radial direction. However, the bridge portion 40 may be formed at a position that is apart from or off the magnetic pole center line C. Other constructions are substantially the same as those of the above-described embodiment, and the same or like component elements are denoted by the same or like reference characters, and descriptions of those component elements will be omitted. The above-described arrangement achieves an advantage of being able to further restrain the leakage of magnetic fluxes produced from the radially inner end portions 27 of the pair of permanent magnets 26 toward the bridge portion 40.

Figure 6B:
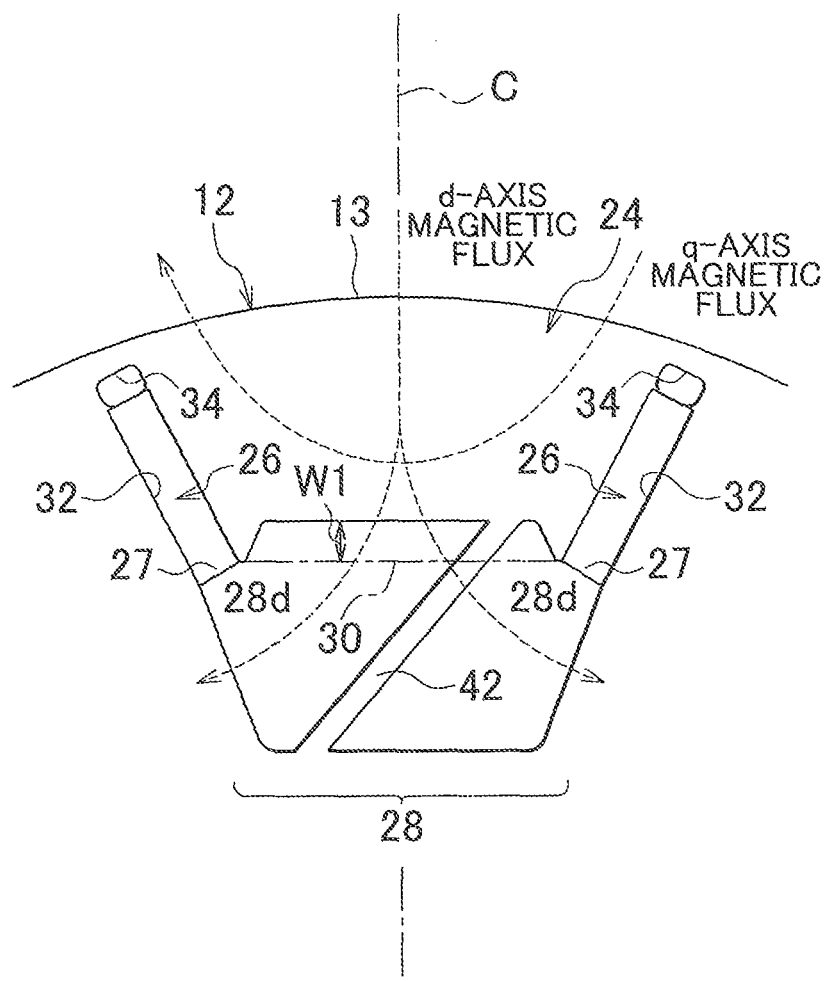
FIG. 6B is a diagram showing a third modification of the embodiment that is another example of a magnetic flux-restraining hole that includes one bridge portion.

FIG. 6B shows a third modification in which the magnetic flux-restraining hole 28 of each magnetic hole 24 is constructed of two holes. In this example, the magnetic flux-restraining hole 28 is constructed of two holes 28d and 28d that communicate with the magnet insertion holes 32. These holes 28d are formed on opposite sides of a single bridge portion 42. A radially outer edge portion of each of the holes 28d is extended so as to project beyond the imaginary straight line 30 to the radially outer side. In this example, the bridge portion 42 is formed extending in a direction that obliquely intersects with the magnetic pole center line C so that the bridge portion 42 appears to be a diagonal of a generally trapezoidal magnetic flux-restraining hole 28. Other constructions are substantially the same as those of the above-described embodiment, and the same or like component elements are denoted by the same or like reference characters, and descriptions of those component elements will be omitted. This arrangement achieves an advantage of being able to further restrain the leakage of magnetic fluxes produced from the radially inner end portion 27 of one of the permanent magnets 26 (the left-side one in FIG. 6B) toward the bridge portion 42. Furthermore, since the bridge portion 42 is made longer than the bridge portion 40 in the second modification shown in FIG. 6A, the magnetic resistance is increased, so that the magnetic flux leakage from the other permanent magnet 26 (the right-side one in FIG. 6B) does not increase.

Figure 7:
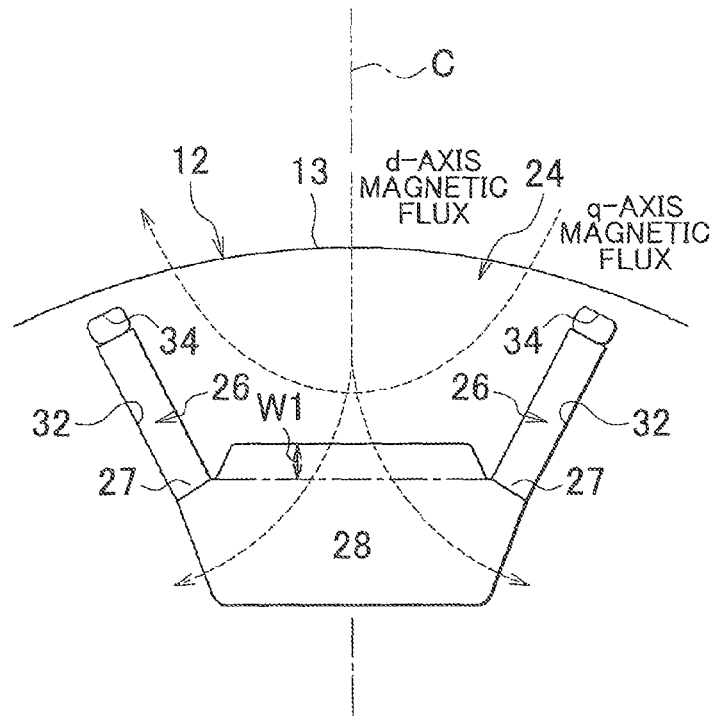
FIG. 7 is a diagram showing a fourth modification of the embodiment that is an example in which the magnetic flux-restraining hole is constructed of a single hole.

FIG. 7 shows a fourth modification in which the magnetic flux-restraining hole 28 of each magnetic pole 24 is constructed of a single hole. In this example, since the magnetic flux-restraining hole 28 does not have a bridge portion, the leakage of magnetic fluxes via a bridge portion is eliminated. However, if it is considered that the reduced area of the iron core region that supports the magnetic pole 24 may decrease the centrifugal force resistance or the torque resistance, the width of the magnetic flux-restraining hole 28 in the direction of a diameter may be set narrow so as to restrain such decrease in the resistance. Other constructions are substantially the same as those of the above-described embodiment, and the same or like component elements are denoted by the same or like reference characters, and descriptions of those component elements will be omitted.

Figure 8:
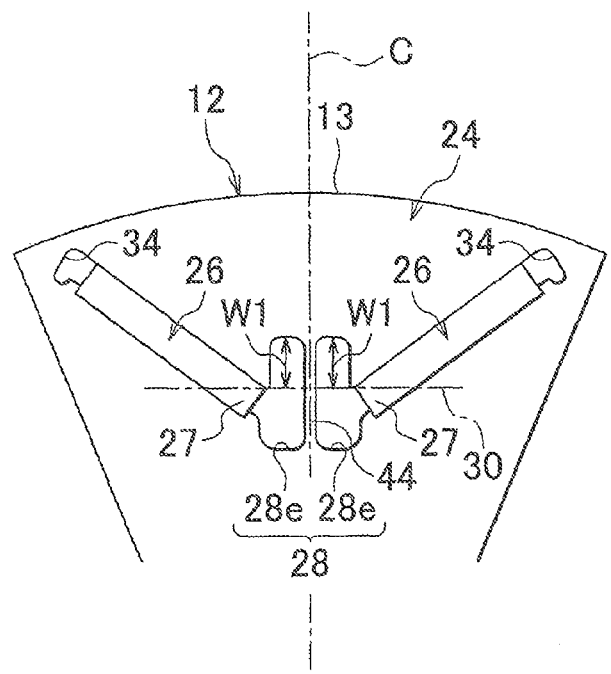
FIG. 8 is an enlarged partial view of a fifth modification of the embodiment, showing a magnetic pole in which a pair of permanent magnets are disposed with their radially inner end portions being adjacent to each other.
Figure 9:
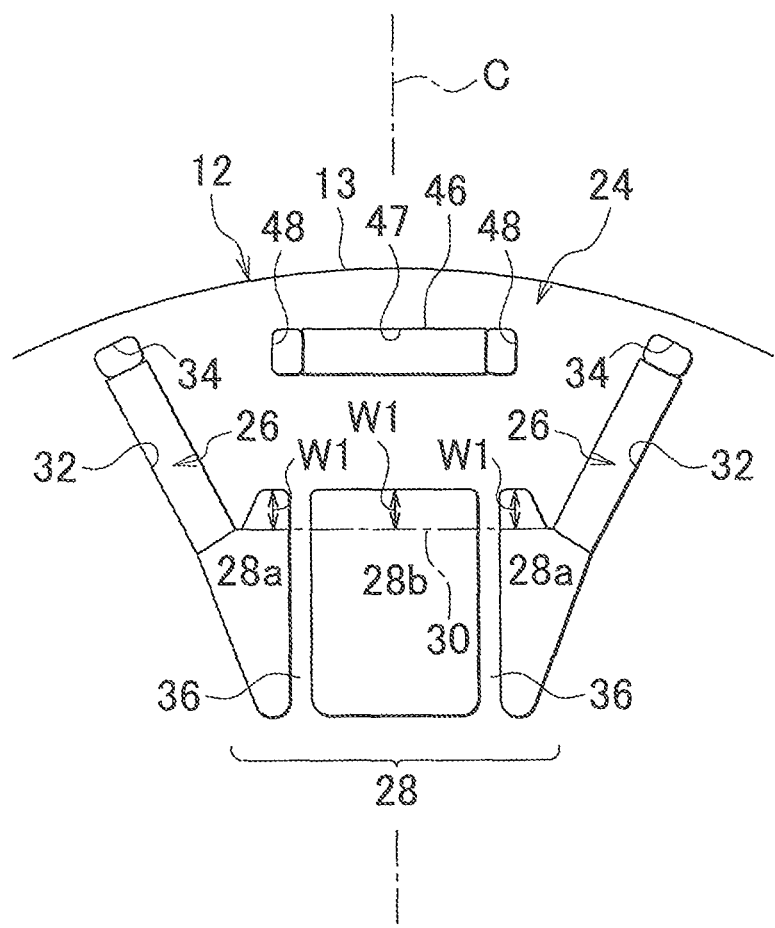
FIG. 9 is an enlarged partial view of a sixth modification of the embodiment, showing a magnetic pole that includes a pair of permanent magnets and another permanent magnet.
Figure 10:
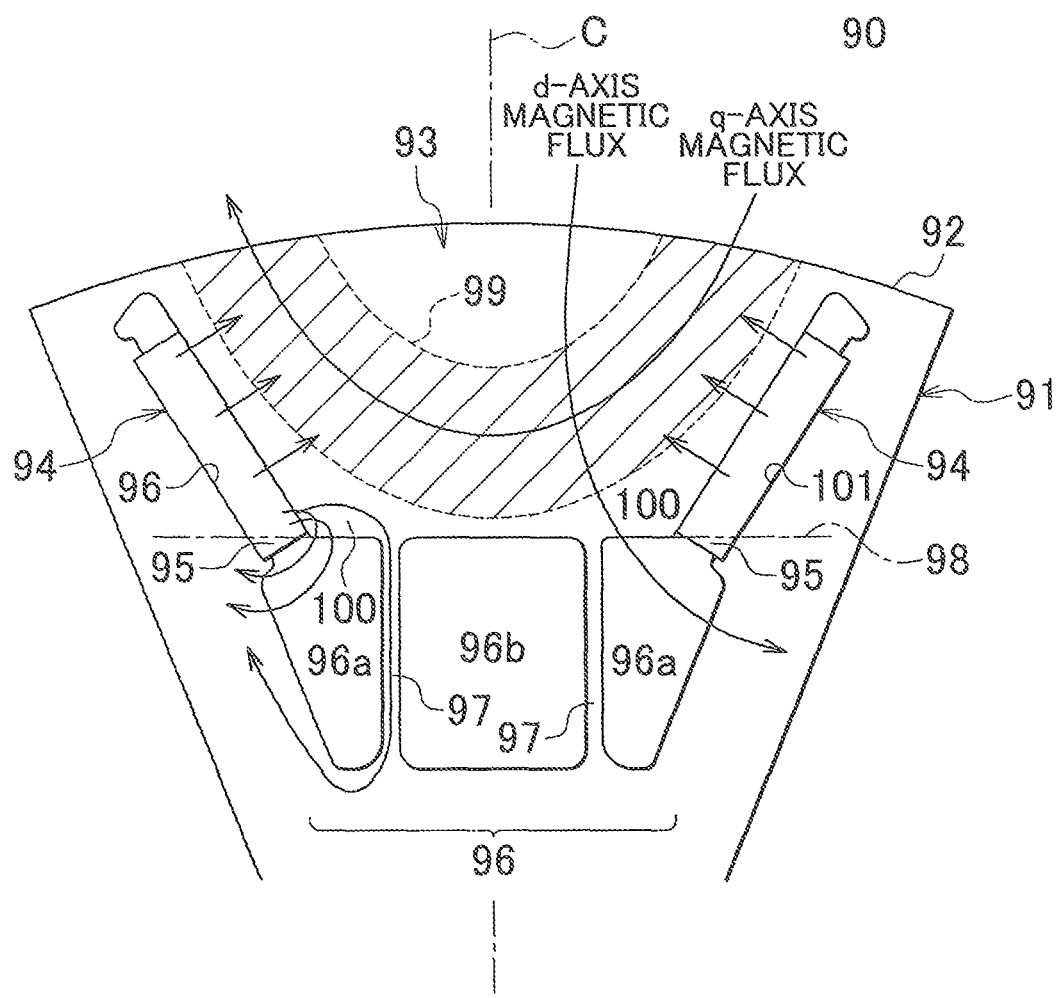
FIG. 10 is an enlarged partial view showing a related-art magnetic pole that has a pair of permanent magnets and a magnetic flux-restraining hole.

FIG. 8 is an enlarged view showing a fifth modification in which the radially inner end portions of the pair of permanent magnets 26 are disposed close to each other in each magnetic pole 24. In this modification, the pair of permanent magnets 26 are disposed in such a generally V shape as to expand toward the outer peripheral surface 13. Between the radially inner end portions 27 of the permanent magnets 26, two holes 28e and 28e are formed on opposite sides of a bridge portion 44. A radially outer edge portion of each of the holes 28e and 28e is also extended so as to project beyond the imaginary straight line 30 to the radially outer side. This example is also able to achieve substantially the same effects as the above-described embodiment.

Incidentally, although the examples in which each magnetic pole has pair of permanent magnets have been described above, the invention is not limited to these examples. For example, as in a sixth modification shown in FIG. 9, each magnetic pole may further include a permanent magnet 46 in addition to a pair of permanent magnets 26. In this construction, the permanent magnet 46 is disposed in the rotor iron core 14, in the vicinity of the outer peripheral surface 13, and extends substantially in the circumferential direction, and a q-axis magnetic path of a generally circular arc shape or a generally U shape is formed between the pair of permanent magnets 26 and the magnetic flux-restraining hole 28.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A rotor for a rotary electric machine, comprising:
a rotor iron core; and
a plurality of magnetic poles provided at intervals in a circumferential direction of the rotor iron core within a radially outer-side interior of the rotor iron core, wherein
each of the magnetic poles includes a pair of permanent magnets disposed apart from each other in the circumferential direction, and a magnetic flux-restraining hole that is formed and extended radially inwardly between radially inner end portions of the permanent magnets and that restrains flow of magnetic flux, and
the magnetic flux-restraining hole is extended so as to project beyond a position of the radially inner end portions to a radially outer side, between the pair of permanent magnets, wherein
the pair of permanent magnets are disposed so that an interval distance between the permanent magnets increases toward the radially outer side of the rotor iron core, and the magnetic flux-restraining hole includes two first holes that respectively communicate with magnet insertion holes that are provided for inserting the permanent magnets into the rotor iron core, and a second hole that is formed between the two first holes and that is separated from the first holes by a bridge portion, and a projection width of the first holes from the radially inner end portions of the permanent magnets is larger than the projection width of the second hole from the radially inner end portions of the permanent magnets,
wherein the projection widths of the two first holes and the second hole are widths measuring a distance from an imaginary straight line that connects circumferentially inner corner portions of the pair of permanent magnets to an outer radial edge of the two first holes and an outer radial edge of the second hole,
wherein the two first holes are mirror symmetric about a magnetic pole center line, and the second hole is formed in a rectangular shape and symmetric about the magnetic pole center line.

2. The rotor according to claim 1, wherein
the magnetic flux-restraining hole includes at least one of air gap and resin.

3. The rotor according to claim 1, wherein
the pair of permanent magnets are disposed so that an interval distance between the permanent magnets increases toward the radially outer side of the rotor iron core, and the magnetic flux-restraining hole includes two first holes that respectively communicate with magnet insertion holes that are provided for inserting the permanent magnets into the rotor iron core, and a second hole that is formed between the two first holes and that is separated from the first holes by a bridge portion, and the first holes and the second hole have equal projection widths from the radially inner end portions of the permanent magnets.

4. A rotor for a rotary electric machine, comprising:
a rotor iron core; and
a plurality of magnetic poles provided at intervals in a circumferential direction of the rotor iron core within a radially outer-side interior of the rotor iron core, wherein
each of the magnetic poles includes a pair of permanent magnets disposed apart from each other in the circumferential direction, and a magnetic flux-restraining hole that is formed and extended radially inwardly between radially inner end portions of the permanent magnets and that restrains flow of magnetic flux, and
the magnetic flux-restraining hole is extended so as to project beyond a position of the radially inner end portions to a radially outer side, between the pair of permanent magnets, wherein
the pair of permanent magnets are disposed so that an interval distance between the permanent magnets increases toward the radially outer side of the rotor iron core, and the magnetic flux-restraining hole includes two holes that respectively communicate with magnet insertion holes that are provided for inserting the permanent magnets into the rotor iron core, and the two holes are formed on opposite sides of one bridge portion, and the bridge portion is provided at a center of each of the magnetic poles in the circumferential direction, and
wherein the two holes have the same shape and are mirror symmetric on opposite sides of the one bridge portion.

5. The rotor according to claim 4, wherein
the bridge portion extends along a magnetic pole center line that passes through the center of each magnetic pole in a radial direction of the rotor iron core.

\* \* \* \* \*